(12) United States Patent
Maldonado Saavedra et al.

(10) Patent No.: US 11,340,150 B2
(45) Date of Patent: May 24, 2022

(54) SUBMERSIBLE SYSTEM AND METHOD FOR MEASURING THE DENSITY AND/OR CONCENTRATION OF SOLIDS IN A DISPERSION

(71) Applicant: Universidad de Santiago de Chile, Santiago (CL)

(72) Inventors: Miguel Andres Maldonado Saavedra, Santiago (CL); Cesar Patricio Gomez Ocaranza, Santiago (CL)

(73) Assignee: Universidad de Santiago de Chile, Santiago (CL)

( * ) Notice: Subject to any disclaimer, the term of this patent is extended or adjusted under 35 U.S.C. 154(b) by 908 days.

(21) Appl. No.: 16/067,531

(22) PCT Filed: Dec. 28, 2016

(86) PCT No.: PCT/CL2016/050076
§ 371 (c)(1),
(2) Date: Aug. 10, 2018

(87) PCT Pub. No.: WO2017/113027
PCT Pub. Date: Jul. 6, 2017

(65) Prior Publication Data
US 2021/0164876 A1 Jun. 3, 2021

(30) Foreign Application Priority Data
Dec. 29, 2015 (CL) .................................. 3756-2015

(51) Int. Cl.
*G01N 9/36* (2006.01)
*G01N 9/28* (2006.01)
*B03D 1/02* (2006.01)

(52) U.S. Cl.
CPC ............... *G01N 9/28* (2013.01); *B03D 1/028* (2013.01)

(58) Field of Classification Search
CPC ............. G01N 9/28; G01N 9/36; B03D 1/028
(Continued)

(56) References Cited

U.S. PATENT DOCUMENTS 2,735,944 A * 2/1956 Greer ..................... G01N 23/12
250/383
2,886,051 A * 5/1959 Kroll ..................... B03B 13/005
137/91

(Continued)

FOREIGN PATENT DOCUMENTS

WO 2017113027 A1 7/2017

OTHER PUBLICATIONS

International Search Report, PCT/CL2016/050076, dated Apr. 10, 2017.

*Primary Examiner* — Robert R Raevis
(74) *Attorney, Agent, or Firm* — Intellectual Property Law Group LLP

(57) ABSTRACT

The invention relates to a submersible system (1) for measuring the density and/or concentration of solids in a dispersion, which can be in the form of a liquid, a mixture of multiple liquids, a suspension of solids in liquid, or a combination of these forms, inside of a reactor (11) into which gas in the form of bubbles is introduced, the system comprising: an open, pass-through gas exclusion device (4) having a tubular body (5) with a variable cross-section through which the dispersion without gas bubbles enters, the device coupling to an inlet tube (6); a sealed chamber (8) that has a means for measuring density, when the dispersion circulates between an inlet (14) of the sealed chamber (8) and an outlet (15) of the sealed chamber (8). The outlet (15) of the sealed chamber (8) is coupled to an outlet tube (7) through which the dispersion returns to the reactor (11) in which same is being processed. The system also comprises a transmitter (9) connected to a sensor, which generates an
(Continued)

output signal proportional to the density of the dispersion without gas bubbles by means of the sensor located inside the sealed chamber (8); and a processing unit (10) that generates an output signal (16) proportional to the concentration of solids in the gasless dispersion, as well as the pulp density. The invention further comprises a method for obtaining the concentration and density of the pulp.

10 Claims, 3 Drawing Sheets

(58) Field of Classification Search
USPC ......... 73/439, 32 A, 32 R, 865.9, 865, 19.12
See application file for complete search history.

(56) References Cited

U.S. PATENT DOCUMENTS

| | | | |
|---|---|---|---|
| 4,648,999 A * | 3/1987 | Armstrong | B01F 13/02 210/221.2 |
| 5,078,011 A * | 1/1992 | Morkun | G01N 29/032 73/32 A |
| 5,408,874 A | 4/1995 | Fleck, Sr. | |
| 5,767,775 A | 6/1998 | Shukla | |
| 5,834,625 A * | 11/1998 | Kraus, Jr | B01D 19/0078 73/32 R |
| 7,426,852 B1 | 9/2008 | Rothman | |
| 2010/0242595 A1 | 9/2010 | Paine | |

\* cited by examiner

SUBMERSIBLE SYSTEM AND METHOD FOR MEASURING THE DENSITY AND/OR CONCENTRATION OF SOLIDS IN A DISPERSION

TECHNICAL FIELD OF THE INVENTION

The present invention refers to a system submersible and a method for the measurement of density of a dispersion, which is aerated by introducing gas in the form of bubbles. The term "aerated" will be used hereafter to include gasification using any gas, where the gas is present in the form of bubbles, that is, it is not substantially dissolved in the dispersion. On the other hand, dispersion may be a liquid or solution containing dispersed liquids and/or solids. An example of an aerated dispersion is a multi-phase mixture containing a suspension of finely ground solids in water which form a slurry (dispersion) and gas in the form of bubbles as found in machines for flotation of ore. The present invention is particularly useful for measuring the density and the concentration of solids present in an ore slurry inside a flotation machine where the ore slurry is aerated by ways of introducing gas in the form of bubbles.

BACKGROUND OF THE INVENTION

Multi-phase systems, that is, systems in which more than one phase occurs, are often used in different industrial processes. In those cases where gas is used, this is often bubbled through a fluid containing one or more phases dispersed or in solution. In these systems, the number of solid particles present plays an important role in the process performance.

An example of multi-phase systems is the flotation of minerals in which three phases are involved: solid, liquid, and gas. This process is used in the mineral processing industry for the separation of valuable minerals from those without economic value, while in the industry of hydrocarbons flotation is used to separate droplets of bitumen from sand particles. Other applications related to environmental protection include removal of ink particles from paper fibers in the pulp and paper industry, and in the treatment of wastewater or effluents.

Mineral flotation is a process of separation that is based on the differences in the surface properties of the particles. The process consists of the dispersion of gas, usually air, to form bubbles inside a pond or reactor which contains a suspension of mineral particles in water, forming a mineral slurry. This slurry is conditioned with chemical reagents, such as collectors, depressants, and activators, which action is to modify the surface properties of the particles. Particularly, the function of collectors is to create or to increase the hydrophobicity of the exposed surface of the mineral that one wants to recover, that is, to prevent hydration of the surface. This process is aided by controlling the pH of the slurry by the dosage of pH modifiers such as lime. Frother, another chemical reagent added to the slurry, is adsorbed on the surface of the bubbles thus retarding their coalescence. That is, slowing the reduction of surface area of the bubbles due to the formation of bubbles of greater volume from small bubbles. Frothers also facilitate and stabilize the formation of a layer of foam on the upper part of the pond by increasing the fraction of water that bubbles entrain into the foam.

The bubbles, when ascending freely from the bottom of the pond (flotation machine) through the conditioned slurry, collide with particles forming bubble/particle aggregates when the surface of these particles is hydrophobic. They then continue to move up until they leave the collection area and enter the area of foam. Hydrodynamic conditions must promote the homogeneous distribution of particles and bubbles, in addition to the formation of stable bubble/particle aggregates to minimize the detachment of valuable mineral particles adhering to the surface of the bubbles during their movement upward. In this way the mineral-rich foam brims over the lip of the flotation machine creating a product flow which is called concentrate. In general, hydrophilic particles (gangue) do not adhere to the bubbles and are reported in the other product called tailings. The metallurgical performance of the flotation process, and in turn the financial income of the concentrator plant, are determined by the recovery of valuable mineral (quantity) and the grade of the concentrate obtained (quality).

Due to the size of mining operations, which translates into a high treatment capacity, a small improvement in the metallurgical performance of the flotation process would produce a significant economic benefit, as well as environmental benefits in the management of water. Considering that the ore grade is in a clear decline, the optimization of the flotation process is imperative to keep competitiveness in the market.

Optimization of the operation of the flotation process requires, among other initiatives, development of new sensors installed online to obtain relevant information about the status of the process to make optimizing decisions in real time. Currently, in-line sensors in flotation machines are scarce and are mostly dedicated to measure air flow, slurry PH, foam heights and in some cases, measure grades using X-ray fluorescence analyzers. Recently image processing systems have been implemented. By using digital cameras mounted on the machines to monitor the surface of the foam and determine parameters such as rate of overflow, color and texture of the foam. In this way, the operators react to changes that can only be observed on the surface of the foam, from which is difficult to infer the current state of the process due to the multi-variable and interactive nature of phenomena occurring in the process of flotation. Therefore, a problem operators of floating circuit face is to find and control more efficient operating conditions, hence maximizing the metallurgical performance of the process, is the lack of instrumentation to characterize both the slurry and the dispersion both on line and in real time.

Studies have determined that the density of the slurry partially determines the entrainment of the particles of gangue from the slurry to the concentrate by reducing the quality of the concentrate (grade). Also, as bubbles moving upward inside the flotation machine are the means of transport used by solids to reach the concentrate, an increase in the concentration of solids could saturate the surface of the bubbles thus reducing the transport capacity of particles and diminishing the efficiency of the process.

In some cases, such as in the flotation of fluorite, mineral from the combination of calcium and fluorine in the chemical formula of $CaF_2$ which has a density greater density than other minerals present in the slurry, the variation in the density of the slurry at different points in a flotation circuit has been used as a indication of the efficiency of the process.

STATE OF THE ART

Several Techniques have been developed to measure the density and/or concentration of solids in a suspension flowing through a pipe or confined to a pond or reactor. Below is the description of the techniques known:

Density scale for slurry or Marcy® is a graduated scale widely used in mineral processing plants to determine the concentration of solids in weight of a mineral slurry. This consists of a glass or container of Stainless steel or plastic that at its upper end (near the overflow lip of the glass) has one or more holes that allow to evacuate the excess of slurry poured over the glass thus maintaining a known volume Previously determined (for instance, 1 L). The slurry full vessel is then hanged using a hook of the scale and by means of a needle indicator, rotating clockwise depending on the weight of the vessel full of slurry, as to determine by reading through graduated circles: the mass of the slurry, specific gravity of the slurry (density of the solid divided by the density of the water at 4° c.), and the percentage of solids (provided density of the dry solid is known). This method assumes obtaining of a sample of the slurry using some sampling technique for slurries, and therefore such measuring is not in real-time which prevents its use in optimization and control strategies in real time.

Nuclear densimeters probably are the most used technology at industrial level to determine the density of in-line dispersions and in real time. These consist of generating a beam of gamma radiation using a radioactive isotope, for example, Cesium 137 o cobalt 60 located in one end of a pipe or pond where it circulates or is confined to that particular dispersion. At the opposite end of the pipe/pond a detector is installed. It consists of a crystal that when collided by a beam of radiation, after passing through the walls of the pipe/pond and the dispersion, creates pulses of light that are stored by a photomultiplier tube. This signal then becomes an electrical signal for transmission to equipment such as PLC, DCS or similar. Nuclear densimeters operate under the principle of attenuation, that is, the higher the density of the dispersion, the lower the radiation at the end of the detector and vice versa. These devices are expensive and require qualified personnel for transportation, installation, maintenance, and disposal.

The density of a fluid can also be determined by measuring the natural frequency of vibration with which one or more tubes oscillate when a liquid or dispersion passes through them. The greater the density of the fluid the lower is the frequency of the vibration and vice versa. The relationship between the natural frequency of vibration of the tube (f) and the density of the fluid (ρ) is given by:

$$\frac{1}{f^2} \alpha \frac{\rho}{k} \qquad (1)$$

where k is a characteristic parameter of the tube through which the liquid or flow of dispersion. Currently, Coriolis mass flowmeters allow variables such as mass flow, density and temperature of the fluid circulating through this device to be measured online. However, in those cases where the fluid contains gas bubbles, this type of technology is not recommended since large errors occur in the measurement due to the effect of the gas introduced as described in the MSc thesis dissertation "Aerated flow measurement and modelling of a Coriolis flowmeter" (2014) by Arnoldsen herein incorporated. In addition, Coriolis flowmeters are limited to measuring applications in pipes of reduced dimension, for example, smaller than 6" in diameter.

The density of a fluid can be determined directly through the relationship between the mass and the volume used. Following this consideration, document U.S. Pat. No. 4,285,239 dated Aug. 25, 1981 titled 'Apparatus for measuring varying density of a slurry flowing in a pipeline", reports an apparatus to measure the density of a liquid or a suspension that flows through a pipe. The apparatus includes a section of pipe which is coupled to the rest of the pipe by means of a hydrostatic support which allows the free movement of said portion of the pipe in a direction parallel to the gravitational field of the earth and that by means of loading cells, strain gauges or similar devices allows to measure the weight of the pipe section with the liquid or dispersion inside. Based on this measurement and knowing the weight of that portion of the pipe and the volume used by the fluid therein is possible calculate directly the density. In the case that the fluid contains air in the form of bubbles, the density that this device will measure will be the apparent density (not compensated) and not the density of the slurry without gas (compensated).

In the case that the fluid is inside a reactor, the density of this (p) can be determined by measuring the existing difference in pressure (P) between two points of submersion with known separation (L) according to the following equation:

$$\rho = \frac{P}{g\,L} \qquad (2)$$

where g is the gravitational acceleration.

Document U.S. Pat. No. 4,136,567 from Jan. 30, 1979 and titled 'Pulp density meter" discloses a portable apparatus to measure the density of a liquid or a suspension inside a pond that consists of pressure sensors mounted in a hollow bar and each separated at a known vertical distance. This apparatus uses equation (2) to determine the density of the fluid. This method only allows to measure the density of the fluid for cases where there is no gas dispersed in the fluid, since in that case the apparatus described will measure the apparent density (not compensated) and not the density of the fluid without gas (compensated).

Technologies based on propagation such as ultrasound and microwave have also been used to determine the density of dispersions. For example, US document U.S. Pat. No. 5,708,191 from Jan. 13, 1998 titled 'Ultrasonic fluid densitometry and densitometer", discloses a density sensor based on ultrasound that uses a piece of a wedge-shaped material where the material has an acoustic impedance similar to the impedance of the fluid. The sensor comprises a material having at least two transducers for transmitting and receiving ultrasound signals. The density of the fluid is determined by immersing the material in the fluid and measuring the ultrasound signal reflected from the submerged-fluid material interface.

The scientific dissemination article entitled "Microwave propagation helps measure sludge density" by Hemphill incorporated by reference describes an apparatus that includes the installation of a microwave transmitter and receiver at opposite ends of a pipe through which a dispersion circulates. It has been experimentally determined that the phase shift between the microwave signal emitted and the received signal is linearly correlated with the density of the dispersion.

The volumetric concentration of solids in a suspension of mineral particles in water, which is directly related to the density of the suspension and its components, that is, the density of the liquid and the density of the solid can be estimated by means of the application of the Maxwell equation that considers the measurements of the electrical conductivity of the liquid, solid and suspension. In the particular case of mineral slurry, the magnitude of the electrical conductivity of the solid is negligible with respect to the magnitude of the conductivity of the liquid and of the suspension, and in this way the volumetric fraction of solids ($\varepsilon\_s$) can be obtained by means of the following ratio:

$$\varepsilon_s = \frac{k_l - k_s}{k_l + 0.5 k_s} \quad (3)$$

where $k_l$ and $k_s$ are the electrical conductivity of the liquid and the suspension of solids respectively. The method previously described has been used to calculate the sedimentation profile in thickeners such as the disclosed in the article "Determination of solids holdup in thickeners from measurements of electrical conductivity using flow cells" (1998) by Tavera, Squire, Gomez and Finch, incorporated herein as reference. In this work a submersible probe is used consisting of a PVC tube with metal electrodes in the form of a ring attached to the internal walls of said tube. Once the probe is immersed in a region of the thickener, a potential difference between the electrodes is applied and the resulting electric current that flows through them is measured, in this way the electrical conductance of the mixture of solids and water is calculated. between the electrodes. Subsequently, by determining the cell constant of the ring arrangement, the electrical conductivity of the suspension is determined. The conductivity of the water is measured by submerging the conductivity cell in the upper part of the thickener where only water without solids exists. Then, the volume fraction of solids is calculated using the Maxwell equation (3). The application of this device for the measurement of the volumetric fraction of solids of a suspension containing dispersed gas in the form of bubbles is not direct, since it requires the additional measurement of the volumetric fraction of gas in addition to the electrical conductivity of the liquid which unlike the case of a thickener it can be difficult to obtain.

In the article titled "On-line solids hold-up measurement in mineral slurries by the standard addition method" (2002) by Arizmendi-Morquecho, Perez-Garibay, Uribe-Salas, and Nava-Alonso, herein incorporated as a reference, a method is disclosed to determine the volumetric concentration of solids in a mineral slurry through a modification to the use of Maxwell equation that does not require measuring conductivity of water. The technique is known as "adding standard" and consists of providing a dielectric material with known volume inside a conductivity cell. Again, for the case of an aerated slurry, measurement of the density of the slurry requires additional measurement of the volumetric fraction of the gas.

Below the techniques to measure the density of a suspension that is aerated by introducing of gas in the form of bubbles are described. These methods use of measurement of volumetric fraction of the gas to determine the density of the suspension without gas or compensated:

The article titled "Gas dispersion studies at Highland Valley Copper" (2010) by Hernandez-Aguilar, incorporated herein as reference, describes a method for measuring the density of a mineral slurry, that is, a suspension of solid particles of ore in water, from the measurement of the density of the aerated slurry and the volumetric fraction of gas, using the following equation:

$$\rho_p = \frac{\rho_a}{1 - \varepsilon_g} \quad (4)$$

where $\rho_p$ is the density of the slurry without gas, $\rho_a$ is the apparent density of the aerated slurry, and $\varepsilon_g$ is the gas volumetric fraction. The apparent density (uncompensated) of the aerated slurry is determined from the difference in pressure generated between two immersed points a known vertical distance. To achieve this objective, two tubes are used, each with one open end and the other closed with a different length and which are immersed with their ends open vertically in the mineral slurry aerated inside flotation machines, while the upper end of said tubes is outside the flotation machine. Initially the tubes meet with slurry and air inside, however, as gas bubbles enter the interior of said tubes through the open lower end, these are broken releasing the gas and consequently increasing the gas pressure inside the tube. which pushes the mineral slurry initially inside the tube out of this back to the flotation machine. This process continues until only gas is found inside the tube, in which case the pressure of the gas inside the tube is equal to the pressure at the open lower end, which is determined by the atmospheric pressure plus the hydrostatic pressure exerted. by the column of slurry aerated on said point. Therefore, the tubes are equipped with pressure sensors provided in the top end which allows to determine the density of the dispersion according to equation (2) as disclosed in the article "Gas dispersion measurements in flotation cells" (2007) by Gomez & Finch, incorporated herein as reference. On the other hand, the volumetric fraction of gas is determined by measuring the difference in electrical conductivity of the slurry with and without gas as disclosed in the article "Gas dispersion measurements in flotation cells" (2007) by Gomez & Finch, incorporated herein as reference.

Document U.S. Pat. No. 7,134,320 from Nov. 14, 2006 'Machines and method for providing a density measurement augmented for entrained gas," discloses a system for measuring the density of a fluid passing through a pipe, in addition to other variables. The apparatus consists of a sensor that measures the volumetric fraction of gas by measuring the rate of propagation of the sound and of a density sensor mounted in a pipe that carries an aerated liquid or dispersion. The density sensor measures the apparent density of the fluid, that is, the density of the fluid plus gas (not compensated) and through the independent measurement of the gas volumetric fraction allows to determine the density of the fluid without gas (compensated) using equation (4).

In summary, the techniques proposed above do not offer the necessary characteristics to measure the density and/or percent solids of aerated slurry in flotation machines with the robustness, reproducibility and precision necessary to implement an online monitoring and control system. The proposed invention, however, offers the characteristics that enhance its use in the development of a permanent monitoring and control system:

1. It allows online and real-time measurement of the density and/or concentration of solids
2. The measurement of the density is not affected by the presence of other dispersed phases such gas bubbles
3. Currently measuring technologies based on tube vibration such as Coriolis mass flowmeters have a high accuracy with errors less than 2 kg/m$^3$.
4. Once installed the device in the process does not require re-calibration.

A comparative analysis of the advantages and disadvantages of the different proposed measurement techniques is presented in the following table:

| Feature/Technique | Sampling/Scale Marcy ® | Pressure | Nuclear | Conductivity | Propagation | Present Invention |
|---|---|---|---|---|---|---|
| Aerated dispersions | ☑ | ☒ | ☒ | ☒ | ☒ | ☑ |
| Response time | ☒ | ☑ | ☑ | ☑ | ☑ | ☑ |
| Measuring range | ☑ | ☑ | ☑ | ☑ | ☑ | ☑ |
| Sensitivity | ☑ | ☑ | ☑ | ☑ | ☑ | ☑ |
| Linearity | ☑ | ☑ | ☑ | ☑ | ☑ | ☑ |
| Accuracy | ☑☒ | ☒ | ☑ | ☑☒ | ☑ | ☑ |
| Robustness to error propagation | ☑ | ☒ | ☑ | ☒ | ☑ | ☑ |
| Portability | ☑ | ☑ | ☒ | ☑ | ☑ | ☑ |
| Simplicity | ☑ | ☑ | ☒ | ☑ | ☒ | ☑ |
| Cost | ☑ | ☑ | ☒ | ☑ | ☑☒ | ☑ |

SUMMARY OF THE INVENTION

According to one aspect of the invention, a submersible system is provided where the system has a sensor for the measurement of the density of a dispersion which is aerated by introducing gas in the form of bubbles. The dispersion may be a liquid or a solution containing dispersed liquids and/or solids. The system comprises a tube, immersed vertically in the aerated dispersion, open at its ends and through with a reduction in its cross-sectional area, since the upper end has an opening whose cross-sectional area is greater than the transverse area of the aperture of the lower end and that when immersed in an aerated dispersion produces a continuous downward flow of said dispersion without bubbles through it, which is proportional to the volumetric fraction of gas in the area where said apparatus is immersed. Said open and through pipe is henceforth referred to as the gas exclusion device. In the lower section of said gas exclusion device the apparatus includes a sensor for measuring the density of the dispersion flowing through said sensor. In the case that the dispersion is a suspension of solids, a processing unit also delivers an output signal indicative of the concentration of solids in response to the measurement of the density of the dispersion.

According to another aspect of the invention, a method for measuring the concentration of solids in an aerated slurry is provided, where slurry refers to a suspension of solids in water, and which includes the measurement of the density of the slurry without gas bubbles flowing inside a device for gas exclusion and calculation of concentration of solids in the slurry as a response to the density of the slurry without gas bubbles.

In one of the preferred applications of the present invention, the submersible system is submerged in the recollection area of a flotation machine for mineral. That is, underneath the foam area, to measure the density of the slurry and the concentration of solids.

Components, characteristics, and advantages of the present invention will become more apparent under the light of the followings descriptions of embodiment examples.

BRIEF DESCRIPTION OF THE DRAWINGS

The accompanying drawings are included to provide more understanding of the invention and are part of this description. They also illustrate one of the preferred implementations of this invention.

DESCRIPTION OF THE INVENTION

Figure 1:
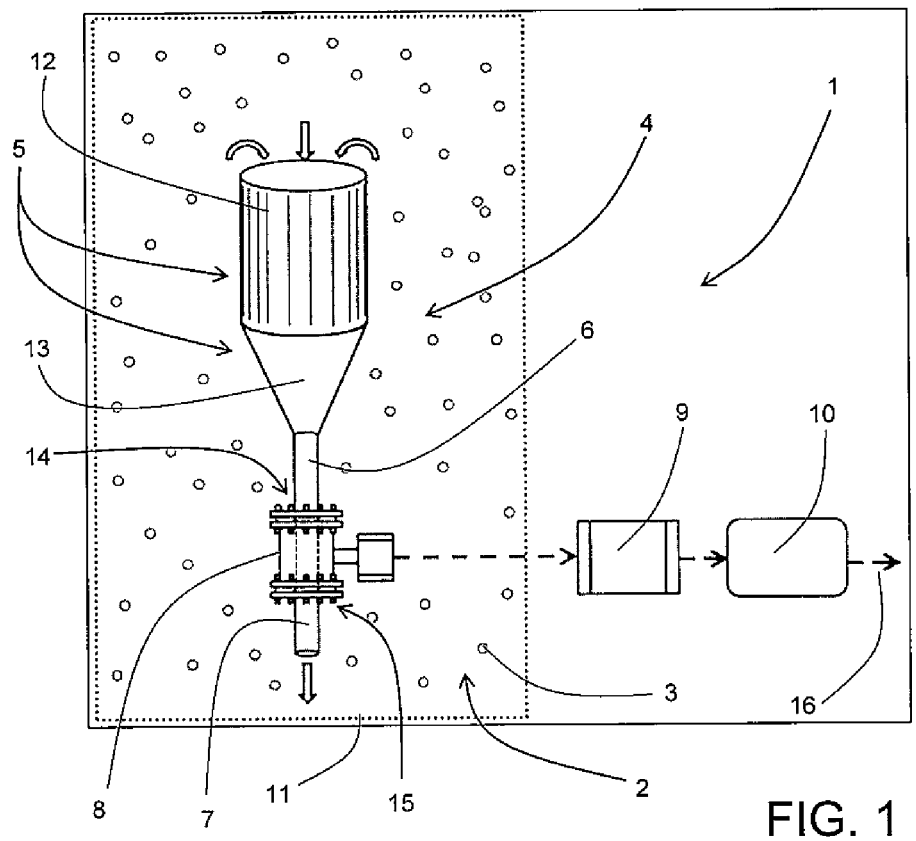
FIG. 1 shows a schematic view of the submersible system for measuring the density and/or solids concentration of a slurry which is aerated by the introduction of gas in the form of bubbles, according to the present invention.

According to what is illustrated in FIG. 1, a submersible system (1) is provided that has a submersible sensor contained in a sealed chamber (8) that allows to measure the density of a dispersion that is aerated through the introduction of gas in the form of bubbles inside a reactor (11). The dispersion (2) can be a liquid or a solution containing liquids and/or dispersed solids. An example of an aerated dispersion is a multiphase mixture containing a slurry of finely ground mineral particles in water to form a mineral slurry and bubble gas (3) such as can be found in a mineral flotation machine. To simplify the explanation of the present invention, the submersible system will be described as a system for online and real-time measurement of the density and concentration of solids of a mineral slurry which is aerated by the introduction of gas in the form of bubbles understanding that the submersible system can be used to measure the density and/or concentration of solids of any other aerated dispersion as long as the gas is present in the form of bubbles, that is, it is not substantially dissolved in the dispersion. As will be described in more detail, the submersible sensor measures the density of the slurry without gas flowing through a device that allows to exclude gas bubbles, to determine the solids concentration of the slurry in the region where the device It is immersed.

The submersible system (1) comprises a gas exclusion device (4), installed vertically inside a reactor or pond (11), consisting of a tubular body (5) whose ends are open and whose cross section presents a reduction from its upper end to its lower end. In the lower section of the gas exclusion device (4), a sealed chamber (8) containing a density sensor that internally has a pipe is fitted directly or through a pipe (6). it has the same diameter as that of the pipe (6). A transmitter (9) electrically connected to the sensor located inside the sealed chamber (8) provides a signal proportional to the density of the slurry circulating through said sensor. The submersible system can consider the connection of a discharge pipe (7) connected to the sensor outlet that has the same diameter as the internal pipe of said sensor. In this way internally, the submersible system (1) can be visualized as a continuous pipe with a reduction in its cross-sectional area from the upper end of the gas exclusion device (4) determined by the diameter of the straight pipe (12) to its lower end determined by the diameter of the discharge pipe (7) as suggested in FIG. 1.

A processing unit (10) determines the concentration of solids in response to the signal generated by the transmitter (9), which is proportional to the density of the slurry.

The reduction in the opening of the lower end of the submersible system (1), that is, the opening of the pipe (7), prevents the free entry of bubbles (3) into the interior thereof, which produces a difference in bulk density of the aerated slurry on the outside of the submersible system (1) and that of the slurry without gas inside the submersible system (1), which translates into a pressure difference that in turn generates a continuous downward flow of slurry through the submersible system (1) passing through the internal pipe of the sensor contained in the sealed chamber (8) and returning to the flotation machine through the discharge pipe (7). This flow that leaves the submersible system (1) and returns to the flotation machine further prevents the entry of bubbles through the lower end thus completing the exclusion of bubbles inside the submersible system (1). To satisfy the principle of continuity, the slurry continuously enters the interior of the submersible system (1) through the upper end of the gas exclusion device (4).

Figure 2:
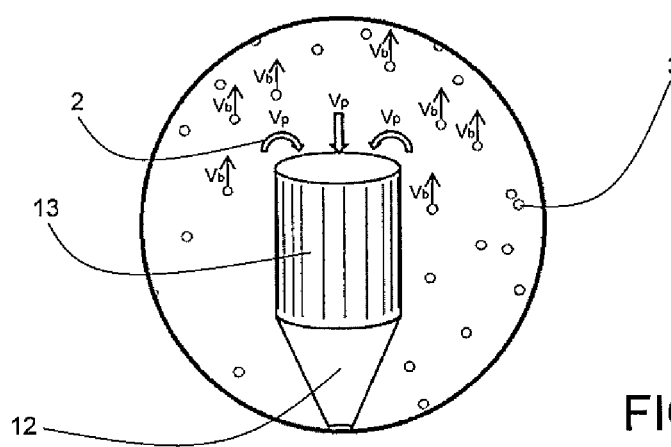
FIG. 2 shows an enlarged schematic view of the upper end of the gas exclusion device, according to the present invention.

The opening of the upper section of the gas exclusion device (4) must be such that the velocity of the dispersion at the inlet to the gas exclusion device (Vp) must be less than the speed of rise of the bubbles (Vb), as illustrated in the example of FIG. 2, to avoid entraining these towards the interior of the gas exclusion device (4). The speed of the continuous flow of slurry through the submersible system (1) depends on the volumetric fraction of gas dispersed in the form of bubbles (3) in the slurry (2) and geometric parameters of the submersible system (1) as evidence by applying the principle of conservation of energy to a fluid element between the upper open end and the lower open end of the submersible system (1)

$$v = C_d \sqrt{\frac{2g\varepsilon_g L}{1 - \left(\frac{d}{D}\right)^4}} \quad (5)$$

where:
v: Fluid velocity through the submersible system (1) measured in its lower section
$\varepsilon_g$: Volumetric fraction of the gas in the aerated fluid
L: Total length of the submersible system (1) according to the present invention
$C_d$: Coefficient of discharge. Value between 0 and 1 that groups the energy losses of the dispersion in its passage through the submersible system (1)
d: Lower end diameter of the gas exclusion cell, that is, pipe diameter (6)
D: Upper end diameter of the gas exclusion cell (D>d). Inlet diameter of the gas exclusion device (4)
g: Gravitational acceleration In one embodiment of the submersible system (1), the density sensor inside the sealed chamber (8) and its respective transmitter (9), are for example a Coriolis mass flow transmitter/sensor that determines the density of the slurry from the measurement of the natural frequency of vibration of an internal pipe full of slurry. The processing unit determines the concentration of solids of the slurry as a response to the measurement of the density of said slurry.

The open and pass-through gas exclusion device (4) consists of a tubular body (5) with one or more different cross-sections. In one embodiment, the tubular body (5) of said open and through gas exclusion device (4) is composed of a straight cylindrical tube (12) of constant diameter, which is open and through at its ends, the which splices with a portion of reduction of diameter (13) also open and through at its ends, such as for example an inverted truncated cone, where the larger diameter of the inverted trick cone is equal to the diameter of the cylindrical tube (12), which it is reduced to a smaller diameter, where it connects with an inlet pipe (6) to the sealed chamber (8) where the density sensor is located. The inlet pipe (6) preferably has the same diameter as the diameter of the internal pipe of the sensor located inside the sealed chamber (8) and the diameter of the discharge pipe (7) as suggested in FIG. 1.

In another embodiment, the tubular body (5) of said open and through exclusion device (4) could be constituted only by a diameter reduction portion (13), which can also be a truncated inverted cone.

The sensor contained in the sealed chamber (8), is adapted to be submerged, and installed in the lower section of the open and through exclusion device (4). The transmitter (9) that can be installed inside the flotation cell (11), or, remotely, for example to the exterior of the flotation cell (11), generates an output signal proportional to the density of the slurry (2) flowing through the sensor located inside the sealed chamber (8) which is processed by a processing unit (10) that generates an output signal (16) proportional to the concentration of solids of the slurry in the region where the submersible system (1) is immersed.

The open and through gas exclusion device (4), and the auxiliary pipes (6) and (7), are preferably made of a material resistant to corrosion and abrasion, for example, ceramic or plastic material (PTFE, PVDF or derivatives) to withstand adverse working conditions for a long period of time. Additionally, these can be coated by an abrasion-resistant means, for example, through a rubber coating. In the lower section of the open and through gas exclusion device (4) a sensor is installed inside a sealed chamber (8) which can be mounted by flanges, held by bolts and nuts, screwed or mounted by a similar technique. The protected sensor inside the sealed chamber (8) is electrically connected to a transmitter (9) that generates an output signal proportional to the density of the slurry passing through the sensor located inside the sealed chamber (8).

The sensor element contained within the sealed chamber (8) is adapted to be immersed in a dispersion, for example, by encapsulating the electronic components of the sensor mechanically or by means of a chemical additive that gives it IP properties. 68

The transmitter (9) is preferably installed outside the aerated dispersion, for example, outside the flotation machine, and electrically connected to the sensor within the sealed chamber (8) by a cable, which is channeled through a duct that protects it from external conditions.

The processing unit (10) receives an output signal proportional to the density of the slurry passing through the sensor located inside the sealed chamber (8) and calculates the solids concentration of the mineral slurry (2). The processing unit (10) can be implemented in any electronic device with processing capacity, such as a computer, a PLC (Programmable Logic Controller), a DCS (Distributed Control System), a microprocessor, or the like.

According to the present invention, the sensor inside the sealed chamber (8) measures in line and in real time the density of the slurry which allows determining the concentration of solids by means of the following equations:

$$\varepsilon_s(vol) = \frac{\rho_p - \rho_l}{\rho_s - \rho_l} \quad (6)$$

$$\varepsilon_s(weight) = \varepsilon_s(vol)\left(\frac{\rho_s}{\rho_p}\right) \quad (7)$$

where
- $\varepsilon_s$(vol): concentration of solids in volume (v/v)
- $\varepsilon_s$(weight): concentration of solids in weight (p/p)
- $\rho_p$: density of the slurry measured by sensor (online)
- $\rho_l$: density of liquid (experimentally determined offline)
- $\rho_s$: density of solid (experimentally determined offline)

Figure 5:
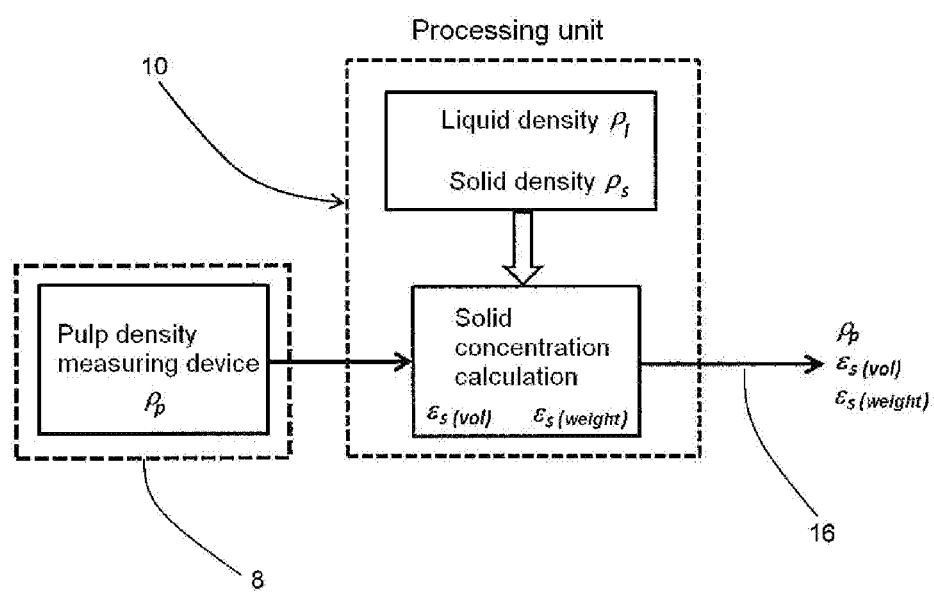
FIG. 5 shows a block diagram of the submersible system for measuring the density and/or concentration of solids, according to the present invention.

The system is provided with a processing unit (10), which block diagram is shown in FIG. 5. The processing unit (10) receives the information from the transmitter (9), with the value of the density of the slurry $\rho_p$ obtained by the sensor located inside the sealed chamber (8), and in addition, said processing unit (10) has stored the density values $\rho_l$ of the liquid (experimentally determined offline) and the density value of the solid (also determined experimentally offline) $\rho_s$, with which it is possible to deliver as output signal (16) the concentration value of solids in volume $\varepsilon_s$ (vol) and weight $\varepsilon_s$ (weight). The processing unit (10), has a screen (not shown) where is possible to show, the calculated data of the concentration value of solids in volume $\varepsilon_s$ (vol) and in weight $\varepsilon_s$ (weight), and even, show directly in its screen the density of the slurry $\rho_l$ that comes directly from the sensor, which allows to measure the density of the dispersion without gas, located in the sealed chamber (8), when the processing unit (10) deflects (bypass) the step of calculation and also shows this value of the density of the slurry. In the vast majority of cases, the liquid used is water, whose density is very close to 1000 kg/m3, where the variation of this value depends on the temperature and environmental pressure. With said processing unit (10) it is possible to implement an automatic control system for the flotation machines.

Figure 3:
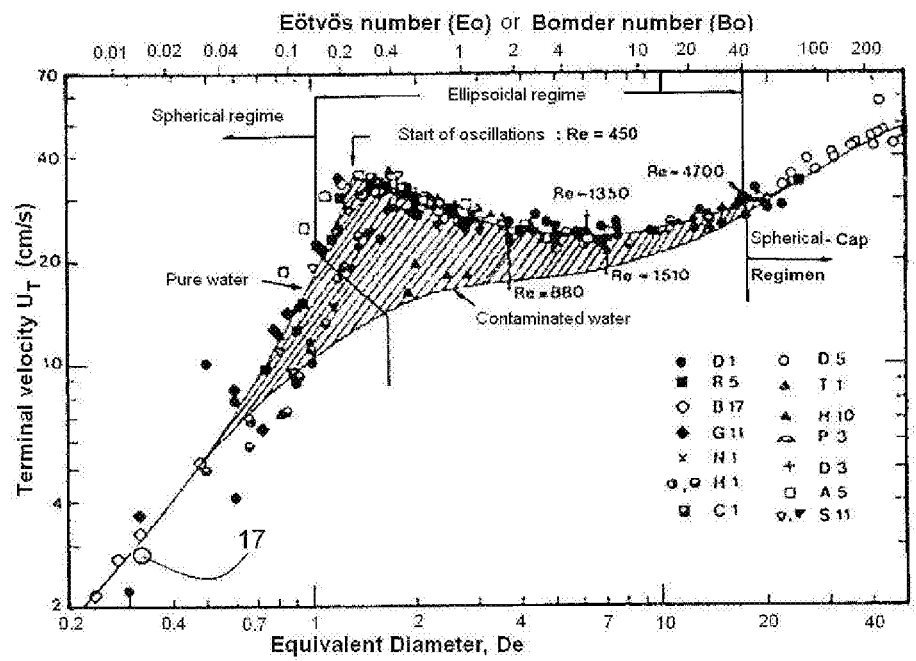
FIG. 3 shows a graph of the relationship between the rate of rise of air bubbles and their equivalent diameter.

The following is an example of the design of one embodiment of the submersible system (1). The main design criteria for carrying out an embodiment of the invention are:

1) The minimum diameter of the internal pipe of the sensor located inside the sealed chamber (8) must be at least 1 inch (25 mm) to prevent the sensor device from being obstructed if there are elements outside the process.
2) The fluid velocity through the sensor located inside the sealed chamber (8) must be at least 0.7 m/s to prevent possible obstruction of the density sensor.
3) The maximum velocity of the liquid or dispersion at the upper end of the gas exclusion cell must be less than 3 cm/s, which prevents bubbles with a diameter greater than about 0.3 mm from being drawn into the interior of the gas exclusion device as shown in reference (17) in FIG. 3.

An example of calculation can be conducted as follows: A mass flowmeter will to be used is a Coriolis March Krohne®, an Optimass 7000 straight titanium tube with a nominal diameter of 25 mm which meets the design condition 1). This flowmeter has a length of 700 mm as shown in FIG. 4.

The total length of the submersible system (1) can be calculated from condition 2) of minimum velocity (0.7 m/s) which is obtained when the volumetric fraction of gas is minimal. For the calculation it will be considered that the volumetric fraction of expected minimum gas is 5%. Also, considering an average discharge coefficient equal to 0.7 and clearing the total length of the submersible sensor "L" of equation (5), we obtain: L≈1000 mm. The previous calculation assumes that d<<D therefore 1

$$\left(\frac{d}{D}\right)^4 \approx 1$$

Figure 4:
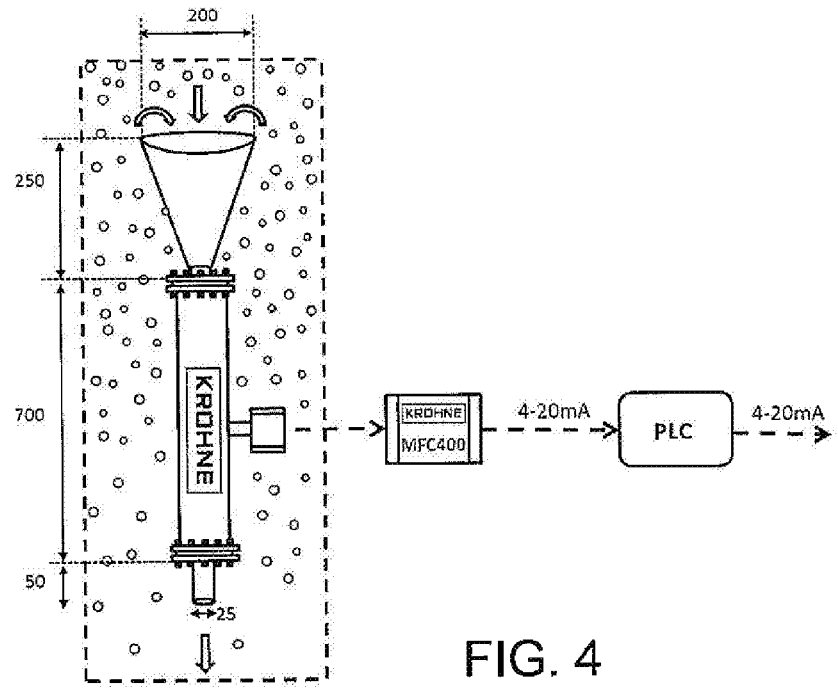
FIG. 4 schematically shows an example with the results of a system design according to the present invention, where the values of the geometric dimensions are expressed millimeters.

Considering the dimensions already found and considering a discharge pipe (7) of diameter 25 mm and length 50 mm then the length of the upper truncated inverted cone of the gas exclusion device, turns out to be 250 mm, as shown in the FIG. 4. It should be noted that in this case the auxiliary pipe (6) in FIG. 1 is not considered in FIG. 4 and that the gas exclusion device consists only of a truncated inverted cone.

It is necessary to check that the design condition 3) is satisfied for the selected dimensions, that is to say that the speed of entry of the slurry at the upper end of the gas exclusion cell is less than 3 cm/s for the maximum value of the volumetric fraction of expected gas which is considered to be 30%. The fluid outlet velocity value "v_2" in the discharge pipe (7) for the selected conditions, obtained using equation (5), is 1.70 m/s. Then, the velocity at the upper end can be calculated by the continuity equation, this is:

$$v_1 A_1 = v_2 A_2$$

Where v_1 and v_2 is the speed of the slurry at the upper and lower end respectively and A1 and A2 is the cross-sectional area of the gas exclusion cell at the upper end (pipe (12)) and lower (pipe (7)) respectively:

$$v_1 = v_2 \left(\frac{d}{D}\right)^2 < 0.03 \; [m/s]$$

When choosing the upper diameter of the gas exclusion cell equal to 200 mm the result is:

$$v_1 = 1.7\left(\frac{25}{200}\right)^2 = 0.0265 < 0.03 \; [m/s]$$

Which meets design criterion 3).

With the above results, an example of the design of the submersible device (1) with a Coriolis mass flow sensor located inside the sealed chamber (8), is illustrated in FIG. 4, where the values of the geometric dimensions, millimeters are expressed. It will be appreciated that the Krohne MFC 400 transmitter is installed outside the flotation machine and generates a 4-20 mA electric current signal proportional to the density of the slurry which is transmitted to a PLC which acts as a processing unit generating one or more electrical signals type 4-20 mA proportional to the concentration of solids.

REFERENCES

AriZmendi-Morquecho, A. M., PÉrez-Garibay, R., Uribe-Salas, A., Nava-Alonso, F. On-line solids hold-up measurement in mineral slurries by the standard addition method, Minerals Engineering, 15, pp. 61-64, 2002. 61-64, 2002.
Arnoldsen, K. Aerated flow measurement and modelling of a Coriolis flowmeter. MSc Thesis. Department of Energy Engineering, Aalborg University. Student report.
Concha, F. Solid-liquid separation in the mining industry. Springer, pp. 224-225, 2014, ISBN: 978-3-319-02483-7.
Finch, J. A, & Dobby, G. S. Column Flotation. Pergamon Press, pp. 10, 1990, ISBN: 0-08-040186-4.
Gomez, C. O.; Finch, J. A. Gas dispersion measurements in flotation cells. International Journal of Mineral Processing, 84, pp. 51-58, 2007.
Harbort, G. J. & Schwarz, S. Characterization measurements in industrial flotation cells. Chapter 5 Flotation Plant Optimisation, C. J. Greet (Ed), AusIMM 2010, pp. 95-106, ISBN 978-92-522-47.
Hemphill, J. Microwave propagation helps measure sludge density. Water Engineering and Management. Octubre 2001, pp. 35-36.
Hernandez-Aguilar, J. R. Gas dispersion studies at Highland Valley Copper. Canadian Metallurgical Quarterly, Vol. 49, No. 4, pp. 381-388, 2010.
Jin, H., Han, Y., Yang, S., He, G. "Electrical resistance tomography coupled with differential pressure measurements to determine phase hold-ups in gas-liquid-solid outer loop bubble column". Flow Measurements and Instrumentation, 21, pp. 228-232, 2010.
Mott, R. L. Applied Fluid Mechanics. 6th Edition, Pearson Prentice Hall, 2006, pp. 478, ISBN: 0-13-197643-5.
Tavera, F. J., Escudero, R., Gomez, C. O., Finch, J. A. Determination of solids holdup in thickeners from measurements of electrical conductivity using flow cells. Minerals Engineering, Vol. 11, No. 3, pp. 233-241, 1998.
Arizmendi-Morquecho, A. M., Pérez-Garibay, R., Uribe-Salas, A., Nava-Alonso, F. On-line solids hold-up measurement in mineral slurries by the standard addition method. Minerals Engineering, 15, pp. 61-64, 2002.

The invention claimed is:

1. A submersible system for real-time in-line measuring of density and/or concentration of solids in an aerated dispersion, being in liquid form, in form of a mixture of multiple liquids, in form of a suspension of solids in liquid, or a combination of these forms, within a reactor whereby gas is introduced in the form of bubbles, the submersible system is configured to be immersed into an aerated dispersion inside a reactor, comprising:
a chamber;
a transmitter connected to at least one density sensor, located inside or outside of the chamber, where the transmitter generates an output signal proportional to density of the aerated dispersion without gas bubbles through the sensor located inside the chamber; and
a processing unit that creates an output signal proportional to the concentration of solids of the dispersion without gas in volume or weight, and also the density of the slurry;
an open and pass-through gas bubbles exclusion device which has a tubular body comprising different cross-section areas along its length, where an inlet opening through which the dispersion without gas bubbles enters the open and pass-through gas bubbles exclusion device, having a cross sectional area that is larger than a cross-sectional area of an outlet opening where the aerated dispersion without gas bubbles is released from the open and pass-through gas bubbles exclusion device, and where the outlet opening joins an inlet pipe; and
wherein the chamber comprises a pipe with an intake and an outlet and the at least one sensor which allows measuring of the density of the aerated dispersion without gas circulating between the intake of the chamber and the outlet from the chamber, where the intake of the chamber is attached to an inlet main, and where the output of the chamber is attached to an outlet pipe through which the aerated dispersion returns towards the reactor.

2. The submersible system of claim 1, wherein the tubular body of the open and pass-through gas exclusion device comprises a cylindrical tube with a constant and straight diameter and a portion where the diameter is reduced, wherein the Larger diameter in the portion, where the diameter is reduced, is equal to the diameter of the cylindrical tube and the smaller diameter is equal to the diameter of the inlet pipe of the chamber.

3. The submersible system of claim 1, wherein the open and pass-through gas exclusion device comprises only one section where the diameter is reduced.

4. The submersible system of claim 1, wherein the section wherein the diameter is reduced comprises a truncated, inverted cone.

5. The submersible system of claim 1, wherein the open and pass-through gas exclusion device is mounted vertically on the aerated dispersion within the reactor.

6. The submersible system of claim 1, wherein the transmitter is mounted inside the reactor.

7. The submersible system of claim 1, wherein the transmitter is mounted outside of the reactor.

8. The submersible system of claim 1, wherein the unit of Processing is a computer; a programmable Logic Controller (PLC); a microprocessor; or a Distributed Control System (DCS).

9. A method for measuring concentration of solids in an aerated suspension within a reactor where gas is introduced in a form of bubbles forming a multi-phase system, the method comprising:
(a) providing the inner part of the reactor with an open and pass-through gas exclusion device of variable cross-section that produces a continuous flow of a dispersion without gas bubbles, wherein an inlet opening where the dispersion without gas bubbles enters the open and pass-through gas exclusion device comprises a cross-sectional area that is larger than the cross-section area of an output opening where the dispersion without gas bubbles from the open and pass-through gas exclusion device exits;
(b) providing a sensor to measure the density of the suspension through the gas bubbles exclusion device located in the inner part of a chamber;
(c) measuring the density of the suspension using the sensor;
(d) sending the measurement of the suspension to a transmitter;
(e) creating by the transmitter an output signal which is proportional to the density of the suspension; and
(f) sending the output signal to a processing unit that creates a proportional signal to the concentration of solids in the dispersion without gas, $\varepsilon_s$ in volume or weight, and in addition to the density of the slurry $\rho_p$, wherein the measuring of the concentration of the solids in the suspension within a reactor comprises immersion into the aerated suspension inside the reactor.

10. The method of claim 9, wherein in step (f) the processing unit calculates the concentration of solids in volume and weight using the following equations:

$$\varepsilon_s(\text{vol}) = \frac{\rho_p - \rho_l}{\rho_s - \rho_l}$$

$$\varepsilon_s(\text{weight}) = \varepsilon_s(\text{vol}) \cdot \left(\frac{\rho_s}{\rho_p}\right)$$

where $\rho_l$ and $\rho_s$ are the density of the liquid and solid respectively which must be previously estimated or determined (offline) and $\rho_p$ is the density of the slurry provided by the transmitter.

* * * * *